April 21, 1936.  J. B. WANTZ  2,038,327
X-RAY TABLE
Filed Aug. 30, 1930  6 Sheets-Sheet 1

INVENTOR
Julius B Wantz
BY
ATTORNEY

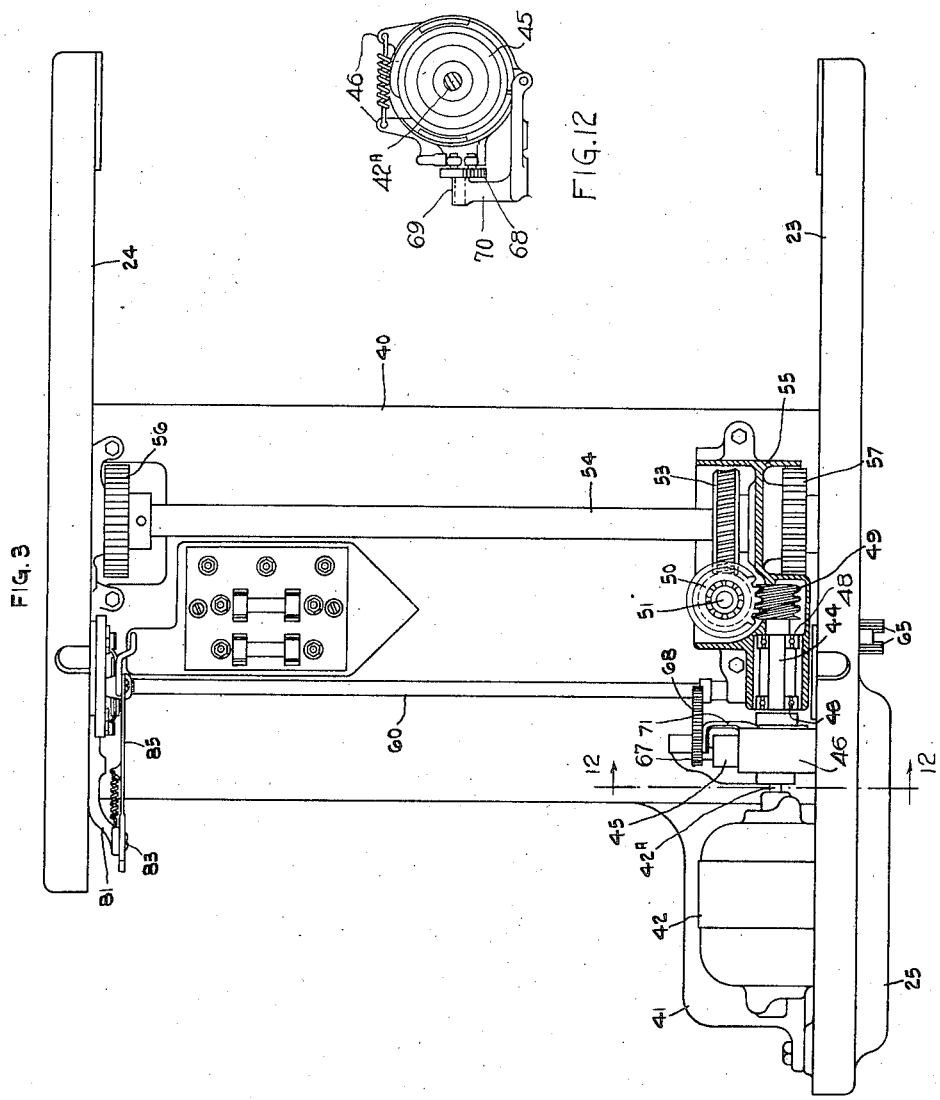

April 21, 1936.   J. B. WANTZ   2,038,327
X-RAY TABLE
Filed Aug. 30, 1930   6 Sheets-Sheet 3
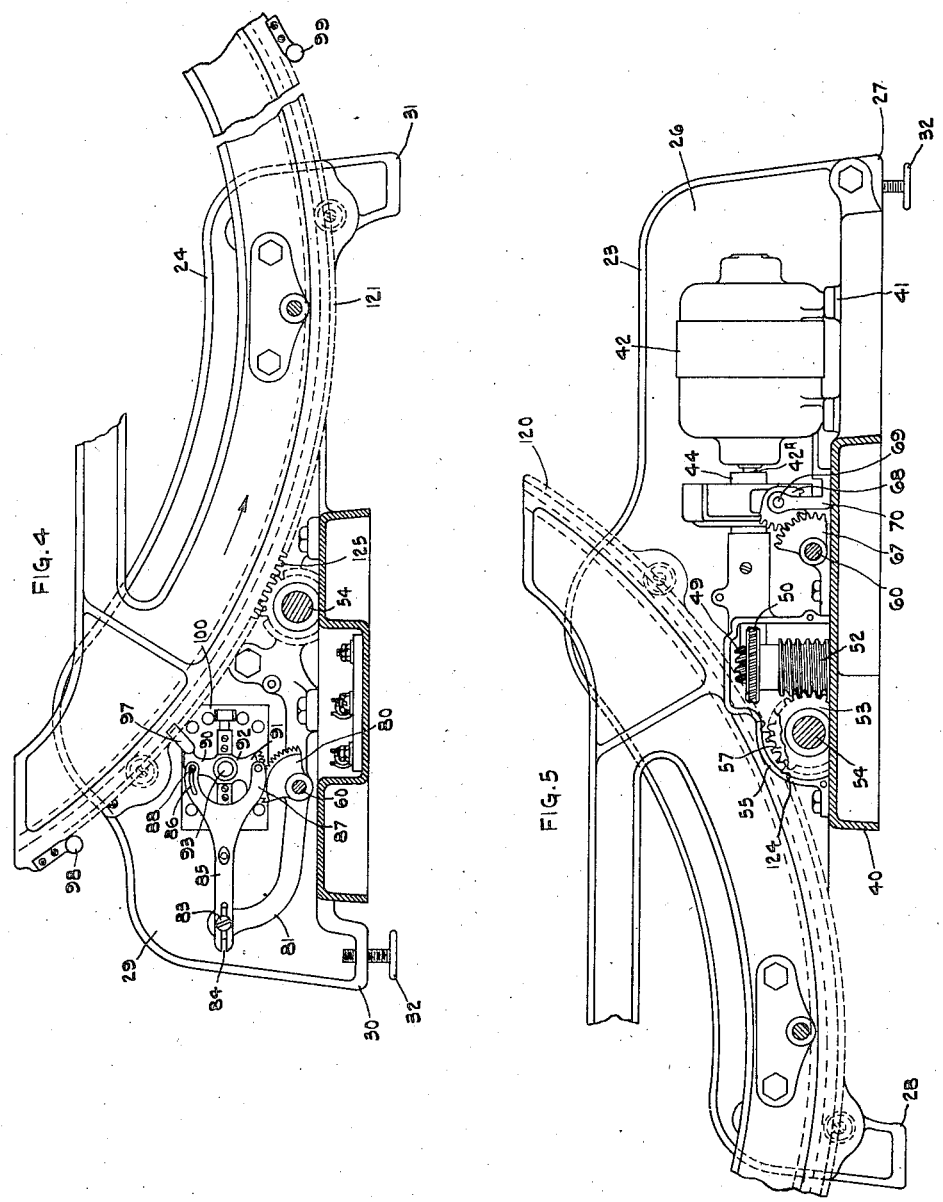
INVENTOR
Julius B. Wantz
BY
ATTORNEY

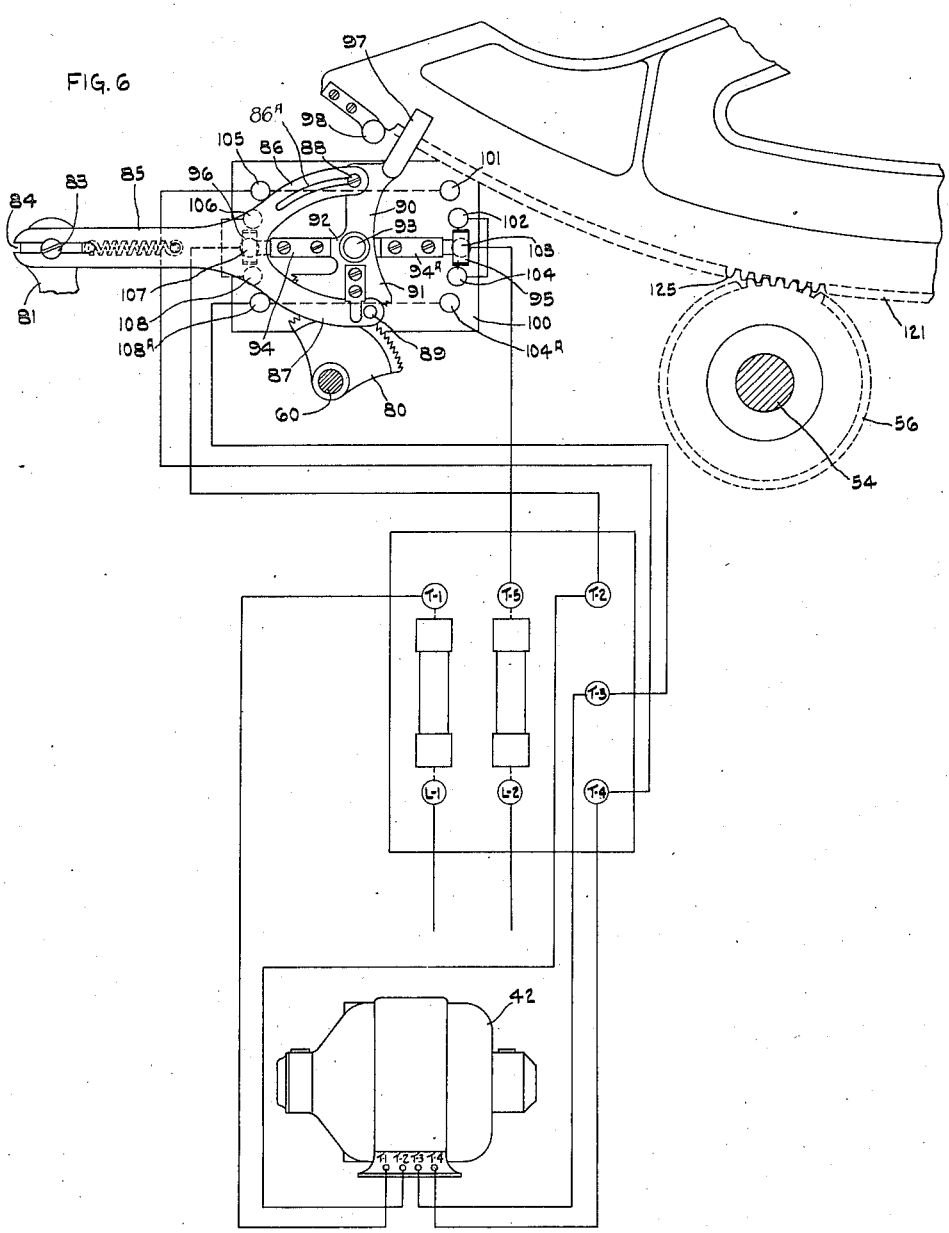

April 21, 1936.  J. B. WANTZ  2,038,327
X-RAY TABLE
Filed Aug. 30, 1930  6 Sheets-Sheet 5
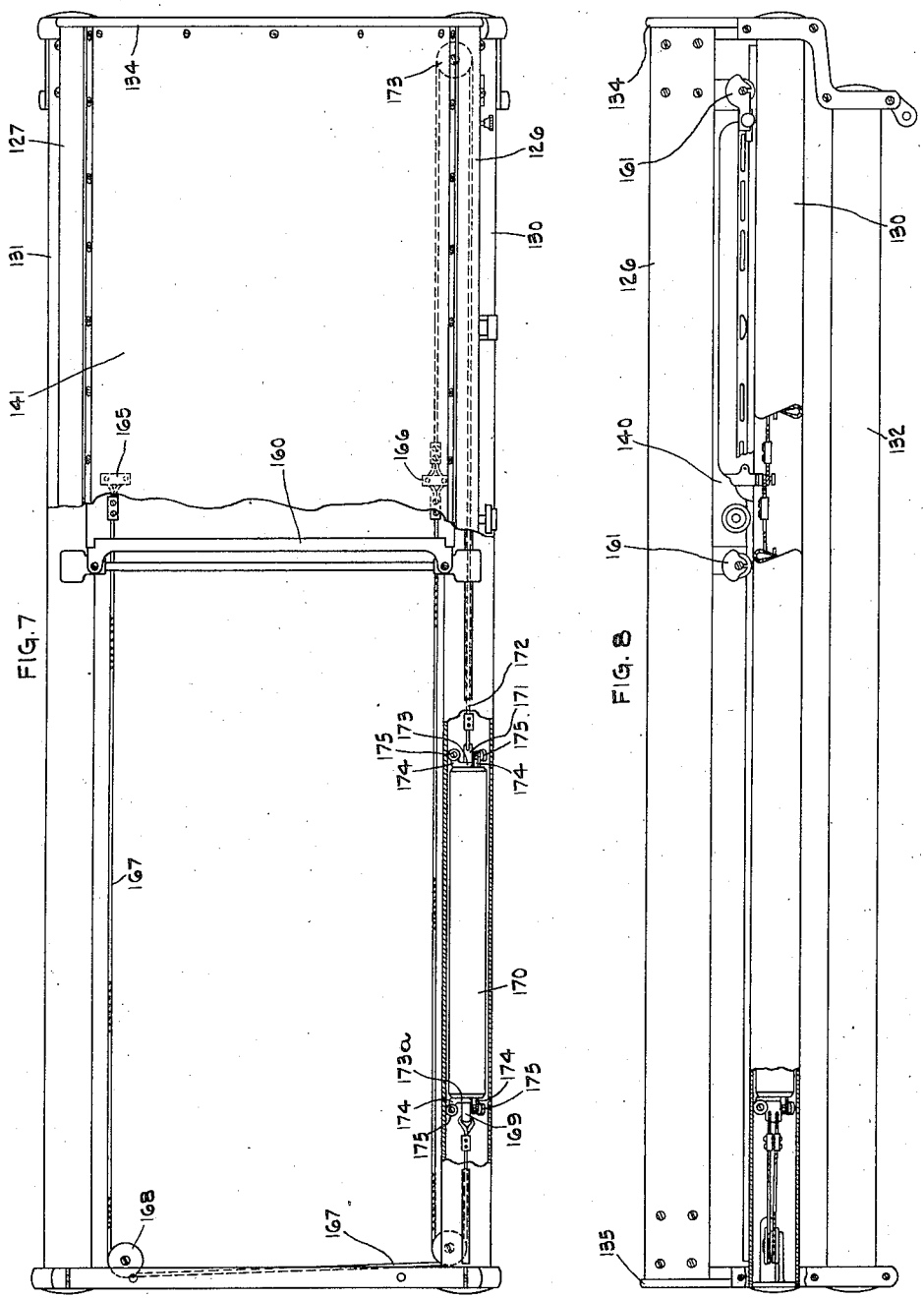
INVENTOR
Julius B. Wantz
BY
ATTORNEY

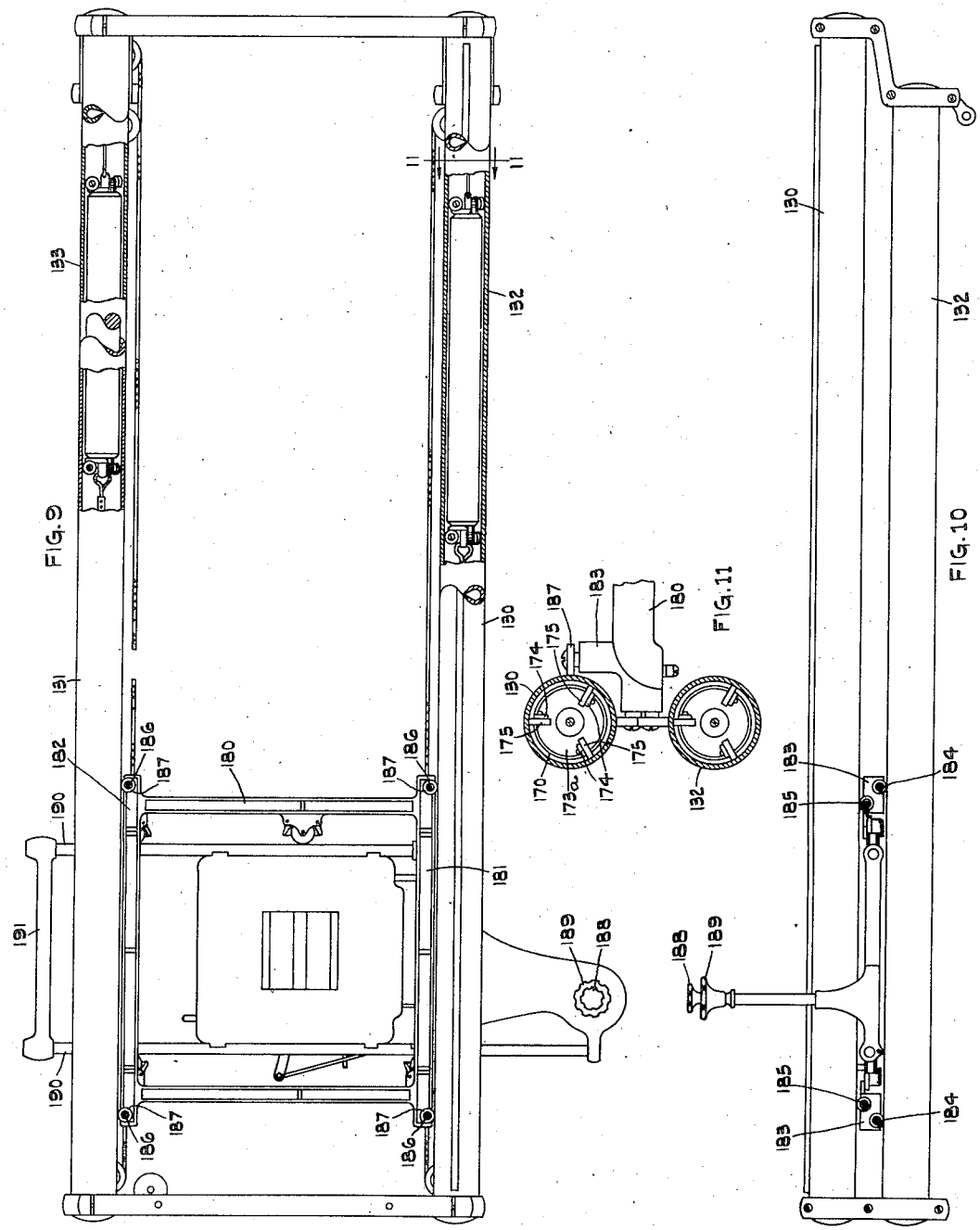

Patented Apr. 21, 1936

2,038,327

UNITED STATES PATENT OFFICE 2,038,327

X-RAY TABLE

Julius B. Wantz, Oak Park, Ill., assignor to General Electric X-Ray Corporation, Chicago, Ill., a corporation of New York Application August 30, 1930, Serial No. 478,943

7 Claims. (Cl. 250—34)

The present invention relates to an X-ray table, and particularly has to do with the elimination of a pivotal support for a table and the accouterments attached to such table. The invention has also to do with means for applying mechanical force thereto for supporting the table top and the control of such force.

In conjunction with such X-ray table, there are shown improved counterweighted screens, an unique tubular body construction, an improved fluoroscopic and Buckey diaphragm field, a new counterweighting arrangement, means for self-aligning Buckey diaphragm and tube carriages, an improved base design for a table, a novel power unit, and improved high tension and X-ray protection.

The primary object of the invention is the provision of a new and improved X-ray table.

A secondary object of the invention is to provide a more open construction for an X-ray table whereby greater facilities may be obtained for the attachment of various items of apparatus thereto, and also facilitating high tension and X-ray protection as well as providing superior flexibility for the device.

Additional objects of the invention include a novel means for counterweighting a fluoroscopic screen and counterweighting a Buckey grid and tube, together with means for aligning the latter members.

An improved side rail construction is a further object of the invention, as is also an improved arrangement for the motor drive and the braking mechanism thereof.

Construction looking towards unit arrangement and interchangeability with other X-ray apparatus has been a further and additional object in the invention.

An improved means for braking a device automatically has also been one of the purposes of said invention.

An advance in a table base and in the centralization of a power unit has been a still further object of the invention.

These objects, and such other objects as may hereinafter appear, are obtained in the novel construction, unique arrangement and improved combination of elements illustrated in the accompanying drawings, in which one form of the invention is illustrated, and in which:—

Figure 3 is a plan view of the table support, part of the housing for the various gears being broken away to show the operation of the gears, brakes, and the position of the fuses;

Figure 4 is a detail in vertical section showing the manner in which the switch apparatus is operated by the movement of the table;

Figure 5 is a vertical section opposite to that shown in Figure 4;

Figure 6 is a further detail of the switch mechanism, partly in elevation, together with a diagram of the circuit employed;

Figure 7 is a plan view, parts being broken away, to illustrate the table top structure;

Figure 8 is a side elevation, partly in section, further illustrative of the table top construction;

Figure 9 is a still further plan view, partly in section, illustrative of the further details of the table top construction;

Figure 10 is a side elevation illustrative of the arrangement of the X-ray carriage in respect to the table side rails;

Figure 11 is a section on the line 11—11 of Figure 9; and

Figure 12 is a transverse section of the braking mechanism taken on the line 12—12 of Figure 3.

Like reference characters are used to designate similar parts in the drawing and in the description of the invention hereinafter given.

Figure 1:
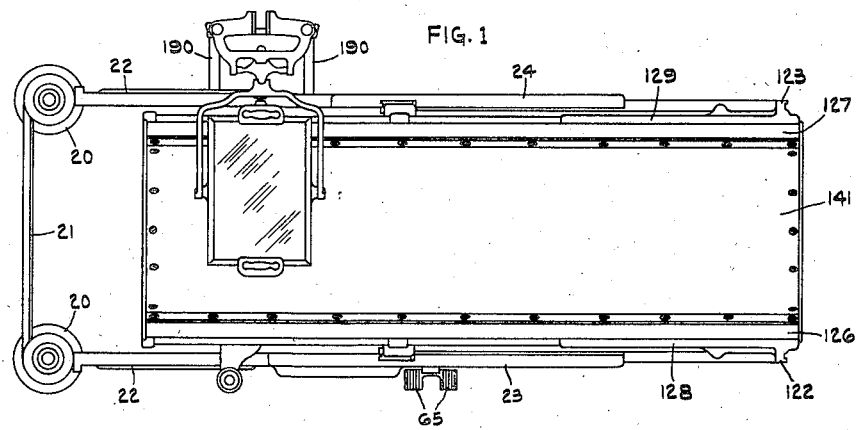
Figure 1 is a plan view of a table embodying the present invention.
Figure 2:
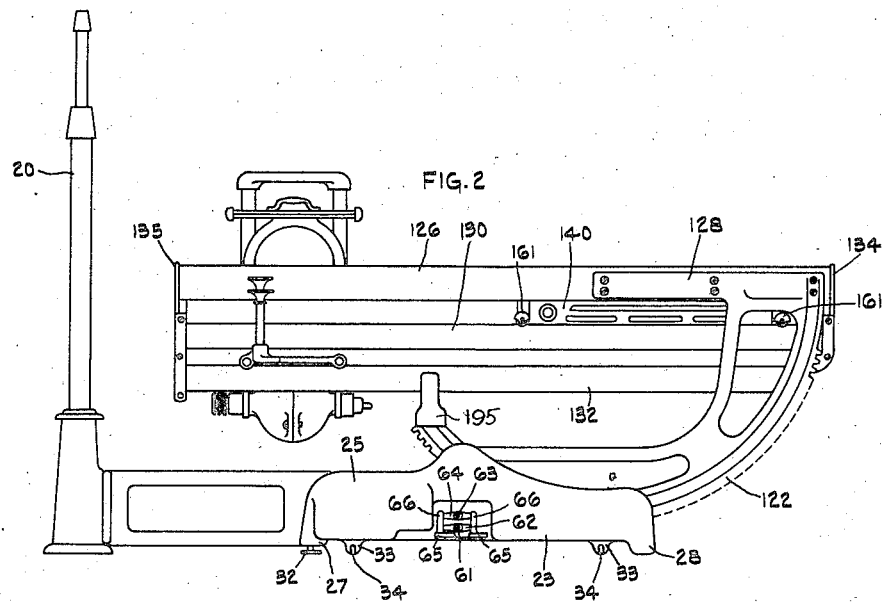
Figure 2 is a side elevation of the table shown in Figure 1.

Reference should be had, for general understandings of the apparatus, to Figures 1 and 2. At the left hand of said figures are upright standards 20 of insulating material used for conducting high tension conduits therethrough to adjacent the base thereof, whence the high tension wires are connected to reels. The reels carrying high tension wires are adapted to be hooked in the usual manner upon an X-ray tube in the table. These parts, i. e., the conduits and reels, have been omitted from the drawings as they are more or less conventional in X-ray apparatus having exposed high tension wires. Of course, the apparatus may be modified to use an X-ray head for an oil immersed X-ray tube in place of the tube holder illustrated.

Said standards 20 are connected by a transverse member 21 which may be in the form of a shield reaching upwardly from the floor.

Secured thereto are side members 22 which extend longitudinally and parallel to the base of the table. When a head is used, members 20, 21, and 22 may be omitted. The base side members of the table are designated 23 and 24, the former having an enlarged section 25 for forming a part of a motor housing. Said member 23 comprises a dished section 26 and has at the ends feet 27 and 28. Member 24 has a similar dished section 29 and feet at its ends 30 and 31. Each foot has a rotatable, adjustable floor engaging member 32 so that an adjustment of the feet of the device may be had whereby the table may be arranged in a truly horizontal position notwithstanding irregularities in the supporting floor.

For coupling this apparatus to other apparatus to produce a substantially unitary structure, there are ears 33 at the side of member 23, each ear having a slot 34 therein to receive a clamping bolt or other connecting member (not shown) whereby to firmly secure the present unit and any other in firm engagement.

To hold members 23 and 24 together is a base member 40, best shown in Figure 3. Side member 23 has an enlarged section 25 providing a partial housing for the motor as previously stated, and said section also houses driving gears, and a brake system, later to be described. There is an extension 41 for member 40 which provides a base for a motor 42 which has its shaft 42a longitudinal of the table. Upon said motor shaft 42a there is a coupling whereby a worm shaft 44 is caused to rotate with motor shaft 42a.

About one end of the worm shaft 44 is a brake drum 45 having thereabout braking bands 46. The brake bands 46 are effective to engage the drum 45 irrespective of the direction of rotation thereof and said bands 46 are spring actuated to engage said drum 45 except when the spring tension upon band 46 is relieved by positive manual manipulation of parts later to be described.

There is provided ball bearings 48 for the shaft 44, and at the other end of shaft 44 there is a worm screw 49 which engages a gear wheel 50 on a vertical shaft 51. Upon shaft 51 and at its opposite end is a second worm 52 which engages a gear 53 upon a transverse shaft 54 journalled in side members 23 and 24. A suitable housing 55 is provided for the support of member 51 which housing extends about gear 53 and also about the driving gears between shaft 44 and shaft 54. At the opposite ends of transverse shaft 54 are gears 56 and 57, which are disposed adjacent the sides 24 and 23 respectively.

A single control means governs the impressing of electromotive force upon the motor 42 and the release of brake bands 46. This control means includes a transverse shaft 60 journalled in side members 23 and 24. At the front side of the table, said shaft has a stub end 61 to which a two ended arm 62 is secured.

Above the stub end 61 is a leg 63 to which is secured for rotation a similar two ended arm 64. Between the ends of said arms 62 and 64 are foot pedals 65 having vertical projections 66. Each vertical projection 66 is pivotally connected to one end of arm 62 and arm 64 so that pressure upon pedals 65 to rotate shaft 60 will be in a truly vertical direction.

Upon the shaft 60 adjacent the side 23 is a segment 67 which engages a segment 68 which is upon a stub shaft 69 journalled in a bracket 70, the latter being secured to base member 40. Upon the face of segment 68 is an arm 71 which extends to the spring actuated brake bands 46 where by a camming action, the spring pressure upon said bands 46 is released whether the shaft 60 is rotated in a clockwise or counterclockwise direction. Thus, as an incident to the application of force to either pedal 65, the brake bands 46 are released from the drum 45, making it possible to rotate motor shaft 42a when, upon further movement of the shaft 60, a switch, later to be described, is actuated to impress electromotive force upon said motor to move it in a direction controlled by the selection of the proper pedal 65.

Shaft 60 is also journalled in a bearing in fixed arm 81 and the end of the shaft adjacent to side member 24 is provided with a segment 80. At the free end of arm 81 is a bearing 83 which is adapted to ride in a slot 84 in the end of a Y-shaped member 85, said member 85 having two arms 86 and 87. Arm 86 is slotted at 86a and there extends through said slot a bearing 88. Arm 87 has a pivoting bearing 89. Bearings 88 and 89 are on the wings 90 and 91 of a member 92 pivoted on a lug 93.

From each side of member 92 are insulated arms 94 and 94a. At the end of each arm 94 and 94a are contacts 95 and 96 which contacts have ends arranged to readily contact two buttons of a series, at each end of an insulating plate and to not, at any time be in contact with more than two of such buttons. Said plate is designated 100, and the buttons at the right hand end (Figure 6) are designated 101, 102, 103, 104, 104a these being contacted by contact 95; at the left hand end of plate 100 (Figure 6), the buttons are designated 105, 106, 107, 108, and 108a. The circuits controlled by spring contacts 95 and 96 to motor 42 through said button contacts will be later described.

From the upper arm of member 92 there projects, a lug 97 which is adapted to be engaged by bosses 98 and 99 on the far arcuate side piece of the table side members later to be described.

When the table is moving in the direction shown in the arrow in Figure 4, boss 98 will engage lug or arm 97 to rotate the member 92 in a clockwise direction, thus disengaging contact 95 from buttons 101 and 102, and contact 96 from buttons 108 and 108a to move contact 95 to buttons 102 and 103 and contact 96 to buttons 107 and 108, which movement breaks the flow of current to motor 42 to energize the motor, the same movement of member 85 rotating shaft 69 to allow the brake bands 46 to contact drum 45, thus arresting the inertia of the table and bringing it to a quick and positive but not jarring stop.

If the movement of the table top is opposite to that indicated by the arrow in Figure 4, the member 99 when the limit of desired table movement is attained engages arm 97 to move member 92 in a counterclockwise direction, to disengage contact 95 from buttons 104 and 103, to make said contact engage buttons 103 and 102, while disengaging contact 96 from buttons 106 and 107 to engage buttons 107 and 108. This de-energizes the motor 42, and the movement of member 85 permits the brake bands 46 to engage drum 45, in the same manner as just previously described, thus bringing the table top to an instant stop without jarring.

When the Y-shaped member 85 is turned in a counter-clockwise direction (as viewed in Figure 6) contact 96 is caused to bridge buttons 108 and 108a while contact 95 is caused to bridge buttons 101 and 102. The circuit through the motor is then from L—1 to terminal T—1 of the motor, through one portion of the winding thereof and from terminal T—2 of the motor to button 108, contact 96, button 108a, terminal T—3 of the motor through the other portion of the winding thereof, terminal T—4 of the motor to button 105, button 101, contact 95, button 102 to L—2. When the Y-shaped member 85 is rotated in a clockwise direction, contact 96 is caused to bridge buttons 105 and 106 while contact 95 is caused to bridge buttons 104 and 104a. The circuit through the motor is then from L—1 to terminal T—1 of the motor, through one portion of the winding thereof, terminal T—2 of the motor to button 106, contact 96, to button 105, terminal T—4 of the motor, through the other portion of the winding thereof, terminal T—3 of the motor to button 108a, button 104a, contact 95 button 104 L—2. Thus, movement of the switch 92 to its extreme positions serves to change the internal connections of the motor, causing a reversal of direction of rotation thereof.

This arrangement of circuits provides a means for preventing movement of the table beyond two specified end limits, first, by shutting off the electromotive force to motor 42, and secondly, by allowing the brake comprising drum 45 and bands 46 to function. One of the incidents to the actuation of member 85 in either direction is that the movement thereof is translated to the foot pedals 65, so that the operative, even when not observing the movement of the table top, has knowledge of its attainment of a limit of its movement in either direction conveyed to him by a forced mechanical movement of the pedal on which his foot is resting.

Instead of using the conventional axle or shaft to support pivotally the movable table portion, there is provided in the present device two arcuate tracks 120 and 121, in the members 23 and 24, these tracks being parallel to one another. Each of said sections 23 and 24 is provided with roller bearings to receive an arcuate table supporting member.

Said table supporting members 120 and 121 have an arcuate periphery which terminates in flanges 122 and 123 adapted to be engaged both beneath and above by the roller bearings in the side members 23 and 24. There is also in each member 120 and 121 a toothed section or rack 124 and 125 corresponding with the periphery of these members and forming the means by which the table may be tilted in one direction or the other, the teeth in said racks being adapted to engage in the gears rotated by the shaft 54 controlled and operated by electric motor 42 already described. The rollers in members 23 and 24 prevent lateral play in the movable table top section because of their close contact with the flanges 122 or 123.

The table proper comprises top rails 126 and 127 in parallelism and paired, to which rails are secured the arcuate side members 120 and 121 just mentioned. Said arcuate side members 120 and 121 have extensions 128 and 129 reaching toward the left of Figure 2, and through these extension portions and through the arcuate member itself suitable bolts are provided for securing thereto said side rails 126 and 127. Suitably spaced beneath sides 126 and 127 is another pair of said rails, 130 and 131, these being cylindrical and being spaced sufficiently apart one from another to provide a track for Buckey diaphragm carriage and for the projection of control members for such diaphragm. Beneath rails 130 and 131, there are paired bottom side rails 132 and 133 spaced sufficiently therebelow to provide a track and guide means for an X-ray tube support adapted to operate beneath the table, and to allow the projection of the control means therefor therebetween. The various details of construction of these parts are illustrated in the later figures in the drawing.

At this point, it is proper to say that the structure illustrated in Figures 1 and 2 permits of an X-ray tube beneath the table being moved the entire length of the table. It therefore may be employed at either end of the table without shifting the position of the patient. Likewise, a fluoroscopic screen or Buckey diaphragm associated with the table may be moved the full length thereof and be used in respect to the tube disposed therebeneath, there being no limitation upon the movement of either of the tube or its appurtenances in respect to the structural length of the table.

There is a Buckey diaphragm 140 disposed just beneath the table top 141, and said diaphragm may be moved lengthwise of the table without restriction within or without the sphere of the X-light emanating from the tube associated with the table, a feature which could not be accomplished and which is not successfully accomplished in the conventional pivotally supported table used in X-ray work.

Figures 7, 8, 9, 10 and 11 detail the structure of the movable table top. As previously indicated, this member has three sets of side rails, a top pair of channel irons, 126 and 127, a pair of tubular rails, the intermediate rails 130 and 131 and a second pair of tubular rails 132 and 133 disposed beneath the first mentioned tubular rails. The side rails 126 and 127 are joined together by transverse frame members 134 and 135, and said side rail transverse members 134 and 135 depend to provide support for the two pairs of cylindrical side rails last referred to, 130 and 131, and 132 and 133.

Intermediate the side rails 126 and 127 the table top 141 is disposed. It has a concave body upon which the patient is adapted to be supported, although a flat table top may be substituted for such concave member. It is sometimes desirable to employ a curved or concave table top in association with a removable flat table top. The latter is provided by a conventional arrangement now familiar in X-ray art.

The Buckey diaphragm 140 comprises a generally rectangular frame 160, having at the sides thereof suitable bearings 161 which are adapted to ride on the upper surface of the rails 130 and 131 and upon the under surface of rails 126 and 127. Said Buckey diaphragm may comprise the usual structure for Buckey diaphragms supported in a frame, the diaphragm being adapted to be projected thereacross by a spring or other suitable motion, the motion being arrested by a dash pot or other device suitable for this purpose.

Connected to the Buckey diaphragm 140 are hooks 165 and 166 at one side thereof. These hooks 165 and 166 are at opposite sides of the device. From said hook 165, a cable 167 is threaded about pulley 168—at the end of the rail or tube 131, the cable 167 continuing into the tube where it is secured to the eye bolt end 169 of a counterweight 170. A second eye bolt 171 is at the other end of said counterweight 170, and to this is secured a second cable 172 which is run about a pulley 173, and then secured to the opposite side of the Buckey diaphragm by hook 166. Within the tubing 130, the counterweight 170 is adapted to move freely, each end of the counterweight being provided with a bracket 173a having a plurality of bearing supports 174. In Figure 11, the bearings 175 in said supports 174 are shown to be disposed 120° apart and adapted to engage the internal periphery of the tube 130 to hold the counterweight 170 away from frictional engagement therewith and to provide for the easy movement of said counterweight 170 therethrough.

Beneath the Buckey diaphragm 160, there is shown in Figures 9 and 10, an X-ray tube carriage. Said carriage comprises a rectangular frame 180 having at its ends 181 and 182 bracketed members 183, as shown in Figure 10. Said frame is adapted to ride intermediate the rails 130 and 131, and 132 and 133, said brackets have a plurality of bearings, one at each side thereof, one pair 184 being adapted to support the device and riding upon the lower rails, 132 and 133 while the second pair 185 being adapted to engage the upper surface of the rails 130 and 131 to prevent any lateral displacement of the device. Also, upon the same brackets 183 and journalled upon an arm 186 thereon is a third roller 187 which rotates in a horizontal plane and which engages the external periphery of the upper tubing 130 and 131 to prevent side movement of said carriage 180, as it moves lengthwise of the apparatus. The X-ray tube carriage is thus held against lateral movement or vertical displacement, and it is at all times assured of free movement because supported and guided by a plurality of rollers which prevent it from being moved away from its track of movement upon the top of both portions of the under rails 132 and 133. Said X-ray tube carriage is adapted to be moved laterally of the frame. (Incomplete disclosure of the sliding portion.) A shutter arrangement is provided upon the laterally movable portion of the frame. (Incomplete disclosure.)

Projecting rearwardly of the carriage 180 are two arms 190 adapted to be joined together by a transverse member 191 to provide a mounting for a fluoroscopic screen, the joining member being a spacer member and said spacer member providing a support for transversely or vertically disposed supporting frame members (not adequately disclosed for the purpose of this application).

For counterbalancing the X-ray tube, its supporting carriage, the shutter associated therewith, and the fluoroscopic screen, two counterpoises are adapted to be moved up and down in the tubes 132 and 133. Each counterpoise comprises a weight or body portion having at each end a bracket providing supports for rollers 120 degrees apart. Each set of rollers in said bracket engages the internal periphery of the tube, and is adapted to move freely therealong whether the tube is in vertical position, horizontal position, or any intermediate position. Each of the brackets has a central eye member to which is secured a cable. The cable is adapted to be run through the tube to the end where it is run about a pulley whence it is directed to one corner of the X-ray tube support and is secured thereto by the hook upon the end thereof engaging the eye upon the frame. At the opposite end of the counterweight is a second cable secured thereto by an eye and hook connection, said cable being adapted to be carried around the pulley at the other end of said tubes, and hooked in or otherwise secured to an eye at the adjacent corner of the X-ray tube support.

The counterpoises are just like those employed upon the Buckey diaphragm previously described. Thus movement of the carriage lengthwise of the table is by means of the handles 188 and 189 so that whether the table is in a vertical, horizontal or intermediate position, movement of the carriage causes the counterweights to be moved in the opposite direction, thus keeping the apparatus in perfect balance at all times. By the provision of the counterweights, the movement of the carriage is facilitated, and relatively little effort is required to move the X-ray tube or the Buckey diaphragm from one position to another. Incidentally, when a selected position is attained, the counterweights maintain the parts in such selected position without locking.

Figure 3 illustrates generally the difference between the two side members 23 and 24. Intermediate these members is the base member 40 which is of considerable width and which is secured to the side members thereby providing a rigid framework for the support of the table. There is in said member 40 a dished section to receive the electrical conduit connections and fuses as clearly shown in Figure 3 which is an illustration with the cover removed from such dished portion.

Movement in either direction, however, causes the segmental gears to release the brake bands 46 of the motor, this to remain released until pressure is removed from the pedal 65 brought about by the operator lifting his foot therefrom, or because of the automatic lifting of the pedal by movement of the table to certain predetermined points in its flight, one at one end of such flight and the other at the other end of such flight in the manner previously described.

It is to be noted that, in the base member 40, there is a pocket into which the several fuses used in the circuit forming a part of the apparatus are disposed and suitable connecting members. Such fuse box and connecting housing are adapted to be closed by the placing of a plate (not shown) thereover, thus entirely covering the electrical connections and fuses in a relatively simple manner, while maintaining such parts within easy access if they are to be reached.

Reference should be had to Figure 4. At two predetermined points upon the member 121 are bosses 98 and 99, one of which is illustrated in Figures 4 and 6. When the table top has reached a vertical position, in one direction, or in the opposite direction has approached the Trendelenberg position, its movement should be stopped. These bosses 98 and 99 are so positioned that, when either of these two positions is just about reached, the boss (98 or 99) engages the movable switch member 92, shown in Figures 4 and 6, thereby to mechanically cause the lifting of the depressed foot pedal 65 which the operator is pressing down, and to concurrently break the electrical circuit to the motor and allow brake bands 46 to operate under spring tension.

Disposed adjacent to the right hand end of Figure 1, is a transverse portion upon which there is a hook member which is adapted to be used when it is desired to hook the Buckey diaphragm at one end of the table and to prevent it from moving or being associated with the fluoroscopic screen.

As shown in Figure 2, a brace member 195 may be interposed between the inner end of member 122 and the contiguous side member 132. One member 195 is used at each side of the table.

I claim:

1. An X-ray table comprising a top, depending end members at the opposite ends of said table top, paired superposed side members intermediate said end members and providing tracks for instrumentalities, instrumentalities on said tracks, arcuate side members secured at one end only to one pair of said side members and secured at the other end to a second pair of said side members to support said top and to provide an unobstructed tunnel of the length of said table top for the movement of instrumentalities therebeneath, a base having tracks therein for said side members, and means for moving said side members relatively to said base to tilt said top.

2. An X-ray table comprising a rectangular frame having side members, a top disposed in the plane of said frame and extending thereacross, arcuate supporting members having one end secured to one end of said side members but removed from and depending beneath and terminating near the center of said side members, the axis of said arcuate members being in a plane not below the plane of said table top in horizontal position, a base having arcuate tracks thereon to receive said free end of said arcuate supporting members, and driven means engaging said supporting members for moving said supporting members relatively to said base on said tracks.

3. An X-ray table comprising a rectangular frame having side members, a top disposed in the plane of said frame and extending thereacross, arcuate supporting members having one end secured to said side members at one end thereof only and depending beneath said end of said side members and terminating short of the other end of said frame, the axis of said arcuate members being in a plane not below the plane of said table top in horizontal position, a base having arcuate tracks to receive said free end of said arcuate supporting members, and means engaging said supporting members for moving said members relatively to said base on said tracks.

4. An X-ray table comprising a top frame having side members, a top thereacross, gear segments of a magnitude greater than ninety degrees but less than one hundred eighty degrees and having one end only secured to said side members, said secured end being attached to the end of said side members, the other end of said segments extending beneath said frame toward the opposite end of said table and providing the main support for said table top, a base having annular tracks therein to receive said segments, other side members below said first mentioned side members, and members normal to the plane of said table top extending from said other side members to the unsecured end of said segments to provide an auxiliary support for said table top frame.

5. An X-ray table comprising a frame, a top coextensive therewith, and means for supporting said frame from one end only and comprising arcuate side pieces secured to and extending from the supported end of said frame and terminating at a point beneath but removed from said frame, the axis of said side pieces being in the plane of said top, a base having track sections to receive said depending arcuate side pieces for supporting said frame and top, and means for moving said side pieces along said track and relatively to said base.

6. An X-ray table comprising a base, rollers on opposite sides of said base and spaced apart to provide parallel arcuate tracks, opposed segments disposed in said tracks and having sections engaging said rollers, a table top frame at one end of said segments, the other end of said segment being free from engagement with said table top frame, a top on said frame, the plane of said table top in horizontal position being not above the axis of said segments, motor means, and gear means intermediate said motor means and segments for moving said segments relatively to said base.

7. A pivotless X-ray table comprising a top having side members, arcuate members of a diameter greater than one half the length of the table top but less than the length of the table top and depending from one extreme end of said side members and terminating beneath said top at a point removed from the lower edge of said side members, the axis of said arcuate members being in the plane of said table top when in horizontal position, a base having opposed sides, each of said sides having rollers providing a track to receive and support said arcuate members, motor means in said base, and driving gears intermediate said motor and said arcuate members for moving said arcuate members upon said rollers.

JULIUS B. WANTZ.